March 14, 1933.  L. F. WILSON  1,901,215
APPARATUS FOR CONDITIONING BOILER FEED WATER
Original Filed July 30, 1928   2 Sheets-Sheet 1
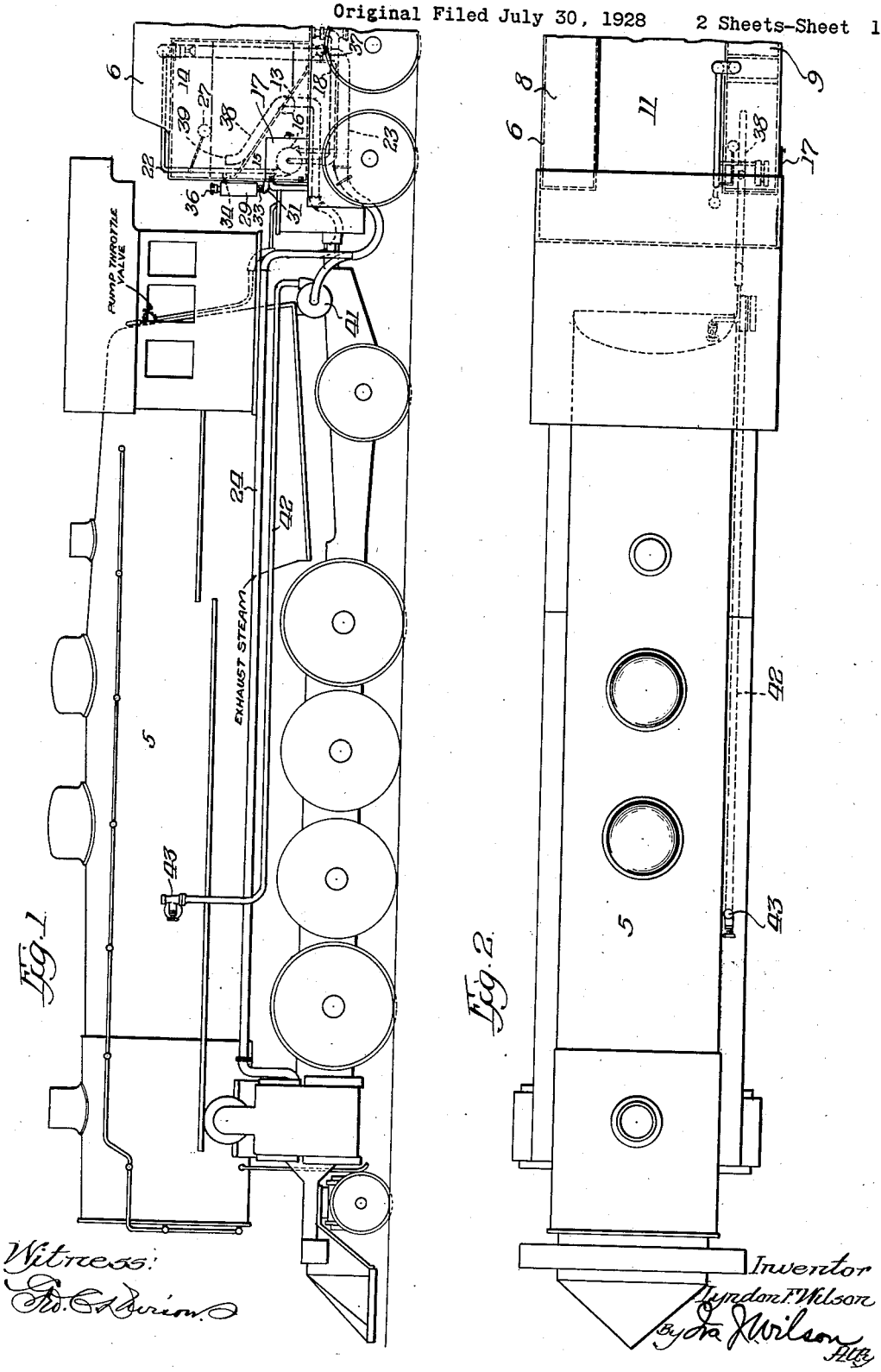

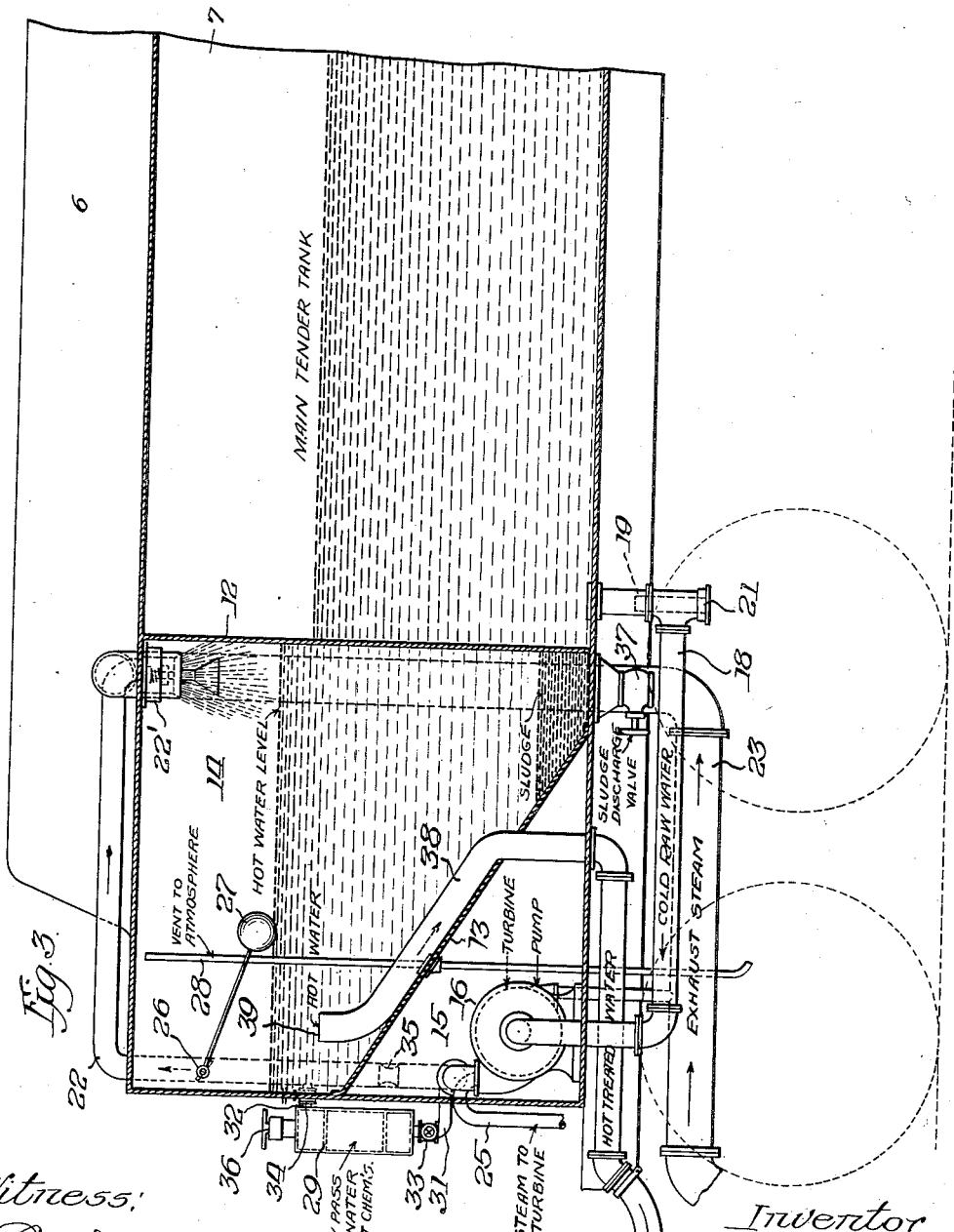

Patented Mar. 14, 1933

1,901,215

UNITED STATES PATENT OFFICE

LYNDON F. WILSON, OF CHICAGO, ILLINOIS

APPARATUS FOR CONDITIONING BOILER FEED WATER

Application filed July 30, 1928, Serial No. 296,180. Renewed July 30, 1932.

This invention relates in general to the conditioning of feed water for use in steam boilers and while the principles are adaptable for conditioning feed water in stationary as well as portable boilers, the specific embodiment selected as illustrative of the principles is herein shown in connection with a railway locomotive boiler.

Different waters used in locomotives in various parts of the country require chemical treatment of some character to render them suitable for boiler use. In some localities a softening treatment is employed to partially, at least, remove from the water the objectionable calcium and magnesium salts which produce objectionable scale in the boilers and in other localities the water is merely treated with an anti-foam compound. The treatment of the water is customarily performed either at the wayside tanks or in the tender tank of the locomotive into which treating chemicals are introduced.

For purposes of economy and efficiency it is also common practice to pre-heat the feed water before it is introduced into the boiler, the pre-heating being effected in a feed water heater by means of exhaust steam. These feed water heaters are of two types; namely, the closed type in which the steam does not come into contact with the water, and the open type in which the steam and water are mixed.

One of the primary purposes of my present invention is to provide an apparatus for both chemically treating and pre-heating the feed water just prior to its introduction into the boiler, the apparatus being designed, however, to store a quantity of the heated and treated water for a sufficient period to permit the precipitation of the objectionable solids therefrom while at the same time maintaining the stored water at a temperature near the boiling point so that it will be introduced into the boiler at a high temperature most conducive to efficiency.

Another object of my invention is to facilitate and expedite the precipitation of the objectionable solids from the heated water by heating the chemically treated water and permitting it to stand for a period sufficient to permit precipitation. Cold water when chemically treated requires considerable periods of time and relatively large capacity in settling tanks for complete precipitation of the solids, whereas, with my invention, the temperature of the water is raised to nearly the boiling point which speeds up the precipitation thus greatly reducing both time and capacity required.

Another feature of my invention lies in the known fact that the treatment of water while hot requires much less amounts of chemical reagents than does the cold treatment. This economy is an object of my invention.

Another feature of my invention resides in the fact that the chemical container is mounted on the tender in accessible position and since it is adapted to hold only a limited amount of chemicals, these chemicals may be changed in accordance with changes in the character of the water taken on at different points thereby enabling water of the required character to be delivered at all times to the locomotive and permitting the locomotive to be driven over long distances regardless of variations in the condition of the raw water taken on at various points. Furthermore the complete precipitation which may be secured by the pre-heating of the chemically treated water reduces the amount of scale and sludge which will accumulate in a boiler and, consequently, materially reduces the number of washouts of the boiler required to maintain it in satisfactory condition.

Another feature of my invention resides in the fact that it makes provision for discharging from the water the oxygen and other gases which tend to produce pitting and corrosion of the boiler. With my invention these gases are freed by the agitation and admixture of the exhaust steam and water in the heater and are then permitted to escape through a suitable vent.

A further object of the invention is to provide a combined heating and treating apparatus which will be simple in construction, light in weight, economical in operation and efficient in use, and one which will materially increase the efficiency of the locomotive and reduce its cost of maintenance.

Other objects and many of the inherent advantages of this invention will be readily appreciated after the same becomes better understood by reference to the following description when considered with the accompanying drawings.

Referring to the drawings

Fig. 1 is a side elevation of a locomotive and its tender equipped with my improved apparatus adapted to carry out my novel method.

Fig. 2 is a plan view thereof, and

Fig. 3 is a vertical fragmentary sectional view taken longitudinally of the tender showing my apparatus on an enlarged scale.

Referring now to the drawings more in detail, reference character 5 indicates generally a locomotive of any preferred type to which is customarily connected a tender designated generally by reference character 6. The tender comprises the water tank 7 terminating at its forward end in two spaced legs 8 and 9, between which is disposed the coal bin 11. The construction thus far described is standard.

My invention contemplates separating the forward portion of one of these tank legs from the remainder of the tank by a partition 12 extending transversely of the leg from top to bottom so as to provide a separated space in the forward portion of the leg. This space, as will be apparent from Fig. 3, is further divided by an inclined partition or wall 13 so as to form a water storage and precipitation compartment 14 with a sloping bottom which permits the precipitates resting thereon to be discharged by gravity and a smaller chamber 15 beneath the partition adapted to receive a turbine pump 16 and other equipment. A door 17 provided in the outer wall of the chamber 15 affords access to the chamber and normally closes the same to protect the chamber contents. The suction side of the pump is connected by pipe 18 with the main tank of the tender and somewhere between the tank and the pump there is interposed a screen for cleansing the water drawn into the pump. For illustrative purposes this screen indicated at 19 is installed in one of the bends of the pipe and may be removed for cleaning purposes by taking off a removable cap 21.

In the upper portion of the compartment 14 and opening into this compartment there is installed a condenser spray-head 22' of any well-known or preferred type adapted to thoroughly mix steam and water flowing thereto and to deliver the same into the compartment. The water is supplied to this heater through the discharge pipe 22 leading from the pump 16 and steam is supplied through an exhaust steam pipe 23 connected by a suitable flexible connection with a main exhaust steam pipe 24 on the locomotive. The exhaust steam supplied to pipe 23 is a part of the exhaust from the locomotive cylinders and from the air compressor, stoker engines and water pumps. Live steam is supplied to the turbine for driving the pump 16 from the locomotive through a pipe 25.

The hot water is maintained at a predetermined level in the compartment 14 by a control valve 26 located in the pipe 22 and actuated by float 27. The oxygen and other gases which tend to produce pitting and corrosion in the boiler and which are freed from the water by the admixture of the steam therewith accumulate in the compartment 14 above the water level from which they are permitted to escape through a vent pipe 28 discharging to atmosphere in main tender tank or beneath the body of the tender, as may be preferred. The pipes 18 and 22 are illustrated as being disposed outside the tender tank but in order to prevent freezing they may, if preferred, be located entirely within the partitioned off portion of the tank leg.

In order to chemically treat the water delivered to the compartment 14, I have mounted upon the tender in accessible position, preferably at the front thereof, a chemical container 29 which is connected to the discharge pipe 22 by branches 31 and 32 provided respectively with control valves 33 and 34. The pipe 22 is provided between the connections just mentioned with a restriction 35 which causes water discharged from the pump to by-pass through the chemical container where it dissolves and carries with it a desired amount of the chemicals in the container. The quantity of chemicals which will be mixed with the water can be regulated by adjusting the valves 33 and 34 as occasion requires. The container which is equipped with a removable top 36 may be replenished at intervals with whatever chemical is demanded by the water in that particular locality and, as the character of the water changes, the character of the chemicals may be changed accordingly thereby enabling the locomotive to be run over long stretches irrespective of changes in the character or conditions of the raw water taken on.

The chemically treated water delivered to the compartment 14 which has been heated by exhaust steam in the condenser spray-head 22', to a temperature approaching the boiling point is permitted to stand in this compartment for a period of time sufficient to permit precipitation of the solids carried by the water. The high temperature of the water greatly expedites this precipitation and the precipitates are collected at the lowest point of the compartment from which these precipitates, commonly known as sludge, may be discharged from time to time by opening the discharge valve 37 which permits the delivery of the sludge under gravity.

The hot treated water is withdrawn from the compartment through a pipe 38 having its intake end 39 disposed well above the bottom of the compartment so that the sludge and precipitates are prevented from entering the pipe. This hot treated water is withdrawn through the pipe 38 by a pump 41 carried on the locomotive from which the water is delivered through a discharge pipe 42 into the locomotive boiler through the injector 43.

It will be apparent from the foregoing that I have provided a method and apparatus for conditioning water which not only pre-heats the water to a temperature desirable for delivery into the boiler but also chemically treats the water and permits this hot treated water to stand so as to enable the precipitation of the solids which are then discharged without being taken into the boiler. Customarily where the water has been treated cold some of the solids are precipitated but many of them are not precipitated until the water is heated up in the boiler and the precipitation thereupon occurs in the boiler. In my method, however, the treated water is heated and precipitation is completed prior to the introduction of the water into the boiler so that the sludge and precipitates are thrown down and discharged and are not permitted to enter the boiler thereby not only increasing the efficiency of the boiler but materially reducing the number of washouts required.

The apparatus provides a simple compact and efficient means for both heating and treating the water in the locomotive tender and by this method the water is delivered to the boiler under the most favorable conditions.

While I have shown and described the preferred form of the apparatus, the details may obviously be varied within wide limits. For instance, I have illustrated turbine driven rotary pumps but reciprocating or other types of pumps may obviously be employed and various other modifications in the details shown and described may be resorted to without departing from the essence of the invention as given in the following claims.

I claim:

1. A locomotive tender including a raw water tank having a forward portion partitioned off to form a hot water compartment provided with a sloping bottom forming the top of a chamber beneath the compartment, a pump mounted in said chamber, pipes connecting the suction side of the pump with the tender tank and the delivery side of the pump with said compartment, an exhaust steam heater connected with the delivery side of the pump, means for conducting exhaust steam to said heater, a sludge discharge at the bottom of said compartment, and a pipe communicating with said compartment above the bottom thereof through which the hot water may be withdrawn from the compartment.

2. The combination with a locomotive tender including a raw water tank having water legs, of a partition dividing one leg of said tank to provide a space separated from the remainder of the tank, an inclined wall dividing said space into an upper water storage and settling compartment and a lower pump chamber, a pump located in said chamber, piping connecting the suction side of said pump with the tender tank, a pipe for conducting the discharge from said pump to said compartment, an exhaust steam condenser connected to said pipe for heating the water delivered to the compartment, a chemical container mounted on the tender and connected with the pump discharge pipe for chemically treating the water delivered to said compartment, means for regulating the water delivered to the compartment so as to maintain a predetermined water level therein, means for delivering sludge from the bottom of said compartment, a vent pipe communicating with the compartment above the water level therein, and a pipe through which the hot treated water is withdrawn from said compartment at a point above the bottom thereof.

3. The combination with a locomotive tender including water legs, of a partition separating a portion of one leg of the tender tank from the remainder of the tank, an inclined partition disposed in said separated portion dividing the same into an upper water storage and precipitation compartment and a lower pump chamber, a pump mounted in said chamber and having its suction side connected with the raw water tank of the tender, an exhaust steam condenser, a pipe connected with the discharge side of the pump for delivering water through said heater to said compartment, means for regulating the water supply to maintain a predetermined water level in said compartment, a chemical container, connections between said container and said discharge pipe by means of which the discharge water is chemically treated, means for withdrawing the hot treated water from said compartment above the bottom thereof, and means for discharging the sludge from said compartment.

4. The combination with a locomotive tender including a water tank comprising a plurality of forwardly extending spaced legs, a partition dividing the forward portion of one of said legs from the remainder of said leg to provide a water storage and clarifying compartment at the forward end of said leg, a conduit for conducting water from the lower portion of said tank to the upper portion of said compartment, means interposed in said conduit for inducing a flow of water through said conduit from the tank to the compartment, means controlled by the water level in said compartment for regulating the flow of water through said conduit so as to maintain a predetermined water level in the compartment, means located in accessible position outside of said compartment whereby the water delivered to the compartment is chemically treated, means for delivering exhaust steam from the locomotive to the water enroute to said compartment whereby said water is heated, means for venting said compartment to permit the escape of detrimental gases therefrom, the heat and chemical treatment applied to the water in said compartment being adapted to cause the precipitation from said water in the compartment of substances detrimental to boiler efficiency, means whereby said precipitates may be discharged from the bottom of said compartment, and means for withdrawing the hot chemically treated water from said compartment at a point remote from the bottom thereof and delivering the same to the locomotive boiler.

5. The combination with a locomotive and its tender, said tender including a water tank having a pair of forwardly extending legs, a partition in one of said legs spaced from the forward end thereof so as to divide said leg and provide a water storage and treatment compartment at the forward end thereof, a pipe connecting the bottom of said tank rearwardly of said partition with the upper portion of said compartment forwardly of said partition, means interposed in said pipe for delivering water from said tank to said compartment, means controlling the delivery of water to said compartment so as to maintain a predetermined water level therein, means for supplying exhaust steam from the locomotive to said water prior to its delivery to said compartment whereby said water is heated, a chemical container mounted in accessible position upon said tender to be supplied with water treatment chemicals, manually controlled means for causing the admixture in regulated quantities of the contents of said container with the water being delivered from the tank to said compartment, said heat and chemical treatments applied to the water being adapted to cause the precipitation from the water in said compartment of substances detrimental to boiler efficiency, means whereby the precipitated substances may be discharged from the bottom of said compartment, and means for withdrawing the heated and chemically treated water from said compartment at a point above the bottom thereof and delivering said water to the locomotive boiler.

In witness of the foregoing I affix my signature.

LYNDON F. WILSON.